Figures 1, 5, 6, 7:
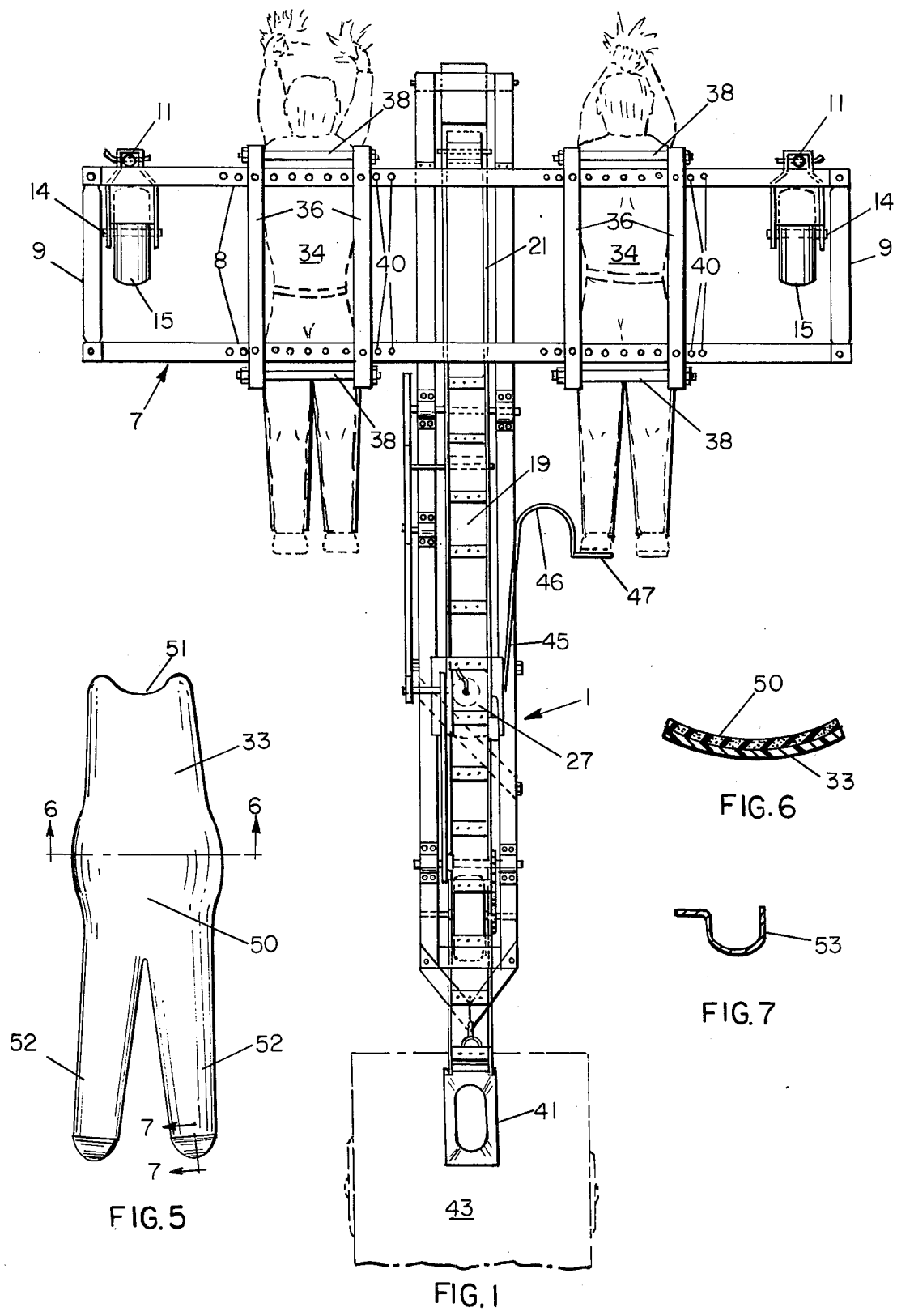

United States Patent [19]

Dibler, deceased et al.

[11] 4,073,392
[45] Feb. 14, 1978

[54] MOBILE SELF-PROPELLED HARVESTER

[76] Inventors: Carson E. Dibler, Colorado Springs, Colo.; Owen O. Cowan, 2420–4th Ave., Pueblo, Colo. 81003; Ruth R. McDonald, 2520–4th Ave., Pueblo, Colo. 81003, successor of said Carson E. Dibler, deceased.

[21] Appl. No.: 733,160

[22] Filed: Oct. 18, 1976

[51] Int. Cl.² .................................................. B60P 3/14
[52] U.S. Cl. ................................. 214/83.1; 180/77 R
[58] Field of Search ...................... 214/83.1; 280/32.5

[56] References Cited

U.S. PATENT DOCUMENTS

| 2,267,234 | 12/1941 | Garber | 214/83.1 |
| 2,524,181 | 10/1950 | Sivertson | 214/83.1 X |
| 2,861,703 | 11/1958 | Imazimi | 214/83.1 |

Primary Examiner—Robert G. Sheridan
Attorney, Agent, or Firm—W. Britton Moore

[57] ABSTRACT

A mobile self-propelled harvesting vehicle adapted to travel along rows of vegetables and having a pair of spaced elongated cradles thereon for supporting workers in face down reclining positions with their arms and hands free for manually picking vegetables as the vehicle is moved along the rows thereover and depositing the same on an endless conveyor for delivery to and depositing in container means rearwardly of the vehicle for packing and removal.

5 Claims, 7 Drawing Figures

MOBILE SELF-PROPELLED HARVESTER

This invention relates to a self-propelled harvesting vehicle for traveling and transporting workers in face down reclining positions over rows of vegetables to enable manual picking and depositing thereof on an endless conveyor for delivery to the rear of the vehicle.

Heretofore, it has been proposed to provide various types of harvesting vehicles for carrying workers for manually picking different crops, such as those represented by U.S. Pat. No. to Finley 2,504,403 — Apr. 18, 1950, Cunningham et al U.S. Pat. No. 3,127,036 — Mar. 31, 1964, Long et al U.S. Pat. No. 3,215,288 — Nov. 2, 1965, and Dilday U.S. Pat. No. 3,664,526 — May 23, 1972. However, these devices have not proved satisfactory because the workers are not so supported thereon thay they can comfortably and effectively pick the crops and depost them on conveyors as the vehicles are caused to travel relative thereto.

The principal object of the present invention is to provide a self-propelled three wheeled harvesting vehicle for traveling over and relative to rows of vegetables and other crops and wherein two workers are supported in face down reclining positions generally parallel to the ground with their arms and hands free for picking and depositing vegetables on a conveyor for delivery to the rear of the vehicle.

Another object is the provision of a three wheeled harvesting vehicle having a pair of spaced apart adjustable cradles for supporting two workers in face down reclining elongated positions extending forwardly and rearwardly of the vehicle so that their arms and hands are free for picking as the vehicle is caused to progress over the ground.

A further object is the provision of a harvesting vehicle having two front wheels adapted to stradle and travel between rows of vegetables and a single rear motor driven wheel spaced rearwardly and interposed therebetween so that workers supported on cradles between the front wheels will generally reclinably overlie two rows of vegetables and may pick the same as the vehicle is caused to travel forward thereover.

Still another object is to provide a three wheeled harvesting vehicle having a conveyor extending longitudinally of the vehicle and above and downwardly at an angle between the downwardly facing reclining workers so that vegetables picked thereby may be readily deposited at the front of the conveyor and delivered to the rear of the vehicle for storage in containers or a following trailer.

A still further object is to provide cradles for adjustably supporting two workers in face down reclining positions on either side of and parallel to the angularly and downwardly depending end of a conveyor so that vegetables being picked from rows adjacent to each worker may be deposited on the forward end of the conveyor.

Another object is the provision of a throttle control adjacent to and operable by the foot of one of the workers for controlling the motor operating the conveyor and driving the rear wheel of the vehicle.

Figure 2:
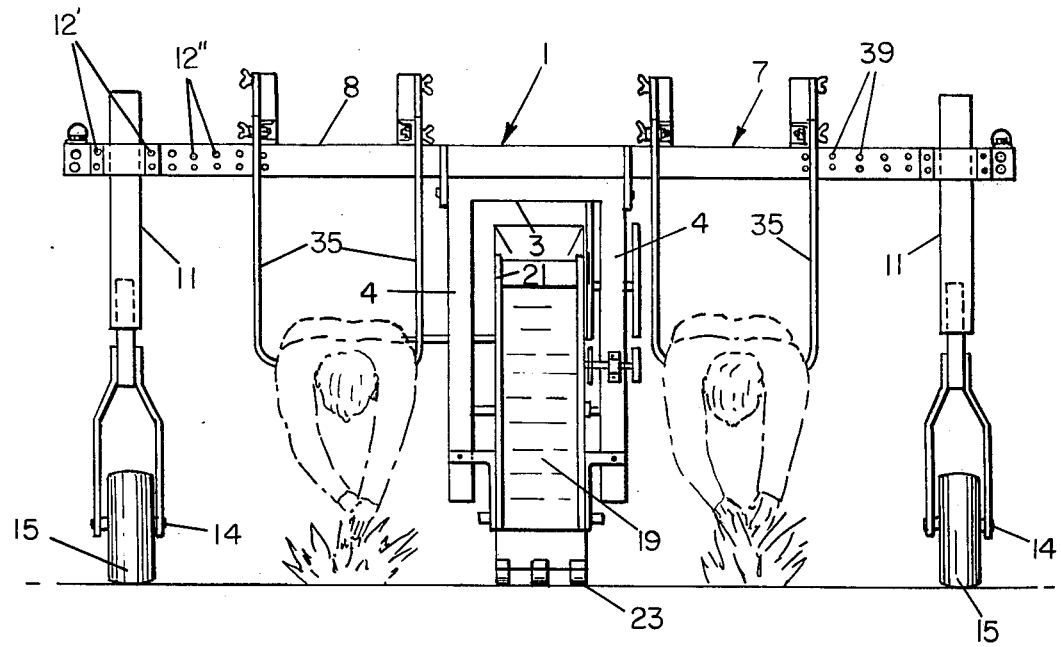
Figure 3:
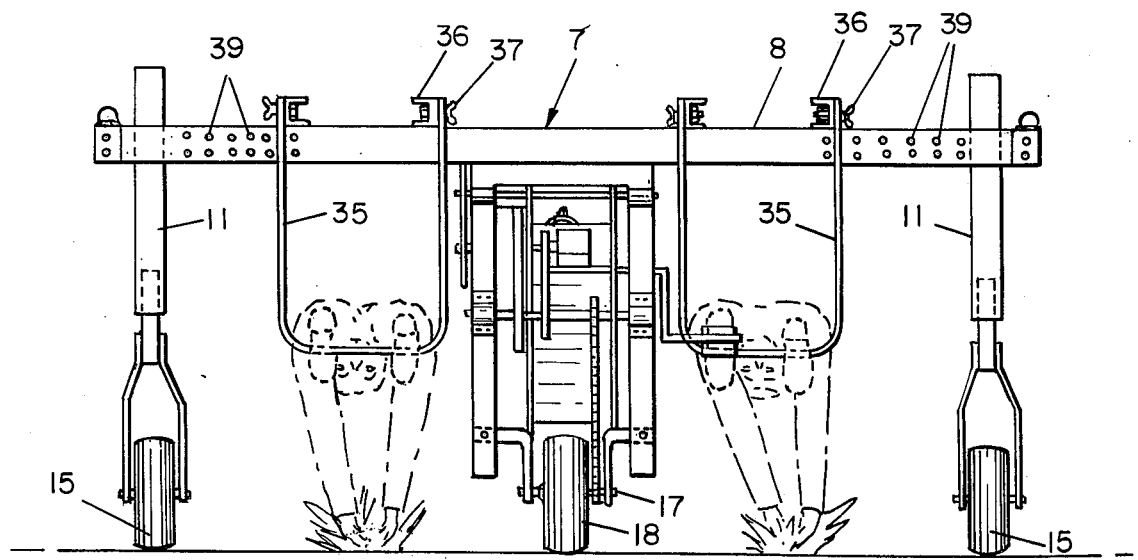
Figure 4:
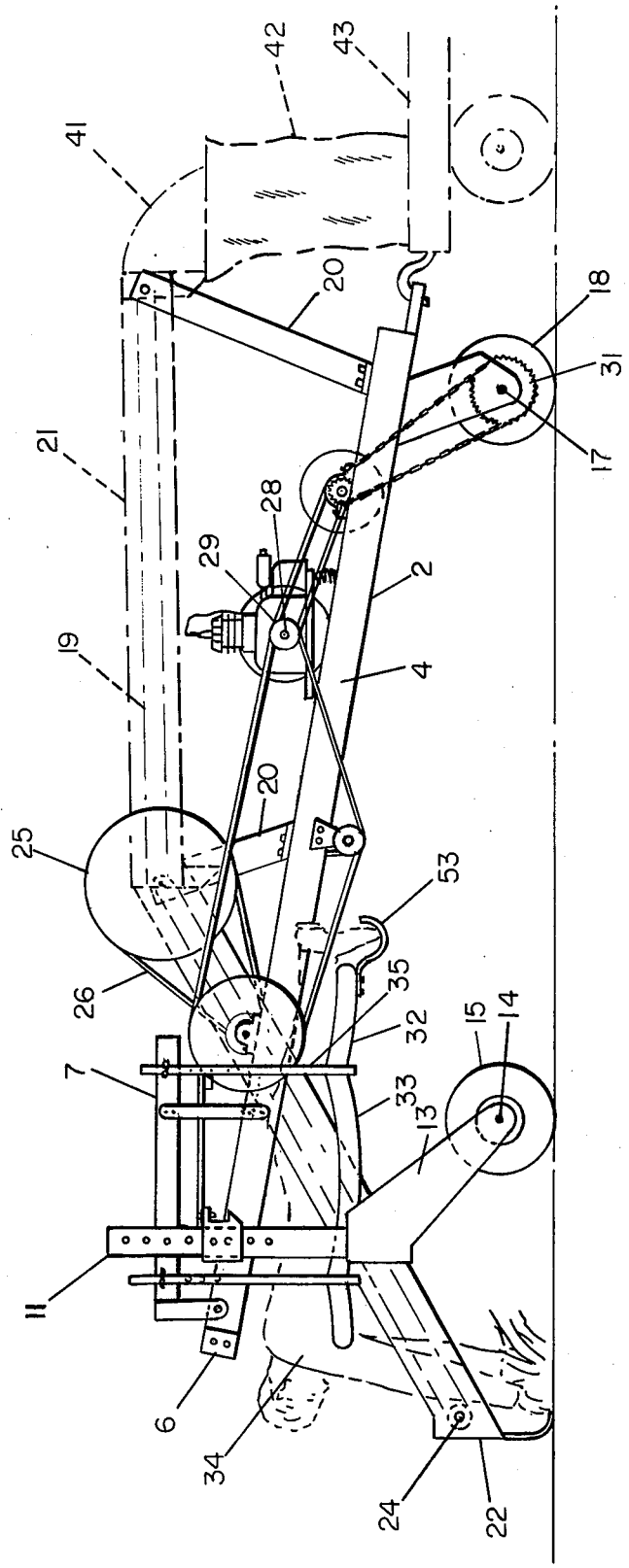

These and other various objects and advantages will be apparent as the specification is considered with the accompanying drawings, wherein FIG. 1 is a plan view of the three wheeled self-propelled harvester showing the positions assumed by workers during picking;

FIG. 2 is a front elevation of the harvester of FIG. 1;
FIG. 3 is a rear elevation of the harvester of FIG. 1;
FIG. 4 is a side elevation of the harvester of FIG. 1;
FIG. 5 is a plan view of a supporting saddle;
FIG. 6 is a section on the line 6—6 of FIG. 5; and
FIG. 7 is a section on the line 7—7 of FIG. 5.

Referring more particularly to the drawings, wherein like reference characters identify similar parts throughout the several views, numeral 1 generally designates a relatively narrow metal chassis including a generally inverted U-shaped longitudinally extending frame 2, having a flat top wall 3 and spaced downwardly extending side walls 4, extends upwardly at an angle of approximately 10° from a lower rear end to an elevated front end 6. A generally rectangular skeleton cross frame 7, having spaced side members 8 and end members 9, extends on a horizontal plane cross-wise of frame 2 and is suitably fixedly attached or bolted to the side walls 4 of frame 2 by brace members. Spaced vertical forward supporting legs 11, suitably attached to the outer ends of the forwardmost side cross frame member 8, have angularly and rearwardly extending yokes 13 suitably affixed to the lower ends thereof carrying axles 14 and caster type rubber tire mounted wheel assemblies 15. A suitable third supporting leg assembly is suitably affixed to the side walls 4 of frame 2 adjacent the lower rear end thereof and depends downwardly therefrom to carry axle 17 and a similar caster type rubber tire mounted single drive wheel assembly 18. The supporting legs 11 and their supporting brackets 12 are so attached by bolts or the like 12' extending through spaced apertures 12" in cross frame member 8 to enable lateral repositioning of the wheel assemblies inwardly or outwardly relative to the central longitudinal frame 2 where the rows of crops and the spacing therebetween so require.

Spaced and supported above elongated frame 2 by strut members 20 is an endless conveyor 19 arranged in an open trough-like frame 21 extending longitudinally of but on a horizontal plane relative to inclined frame 2. A main section of the conveyor extends from a point spaced somewhat beyond the rear end of frame 2 to a midpoint between the ends thereof, where it angles downwardly and forwardly above the ground surface ahead of front wheels 15. The lower front end 22 of conveyor 19 has downwardly and rearwardly curved skid members 23 affixed thereto so that the conveyor will be spaced above the ground and will be conveniently available to the pickers, as will presently be described, with the skid members functioning to prevent the conveyor from contacting the ground during travel of the harvester thereover.

The endless conveyor 19 may be of any suitable conventional type, such as including a flexible ribbed belt extending over spaced idler pulleys 24, journalled in frame 21, and a drive sprocket 25 connected by a chain and sprocket assembly 26 to a sprocket 29 of shaft 28 of a suitable power source 27, such as a gasoline operated internal combustion engine, mounted on and suitably affixed to frame 2. Engine shaft 28 is also drivingly connected by chain or the like to a sprocket 31 on rear wheel assembly axle 17 so that the wheel may be driven to propel the vehicle forwardly in an obvious manner.

Body supporting cradles or slings 32 are suspended in spaced relation below and generally parallel to cross frame 7 at either side of and spaced from frame 2 and include generally rectangular, somewhat concave or dish-shaped, rigid body supports 33 having a soft padding 50 of some suitable material, such as foam rubber, and of sufficient thickness suitably affixed to and positioned on the upper surface thereof that it will accommodate and comfortably support the body and legs of a human body when reclining thereon in head forward and face downward position. While each cradle may be formed from a sheet of metal, such as aluminum, to be sufficiently light and yet rigid to adequately support the human body, this support could be molded or otherwise formed of fiber or suitable plastic so that the upper face would be generally contoured or shaped to correspond with that of a human body and legs. As best shown in FIG. 5, each support 33 is formed with a neck receiving recess 51 and the terminal ends of two slightly diverging leg slightly concave supporting portions 52 are formed into stirrups or cups 53 to receive the shoes and feet of the workers' legs positioned thereon. Each of the supports 33 is suitably bolted or secured to and spacedly supported below and generally horizontally to cross frame 7 by a pair of spaced U-shaped brackets 35 so as to extend longitudinally therebetween and parallel to frame 2. Brackets 35 are suitably secured by bolts or the like 37 to pairs of channel frame members 36 extending across spaced side members 8 of cross frame 7, with members 36 being braced by struts 38. Apertures 39 adjacent the ends of frame members 36 are adapted to be aligned with a series of spaced apertures 40 in side frame members 8 and receive locking pins therethrough to permit of lateral adjustment of the cradles relative to the central longitudinal frame, where spacing between the rows of vegetables varies. It will be apparent that each worker may recline forwardly and face down on and be supported by a cradle so that the head and arms are unsupported and the latter will be free to extend forwardly and downwardly in positions to remove vegetables from planted rows therebeneath as the harvester travels forwardly thereover under the control of a worker. As the vegetables are picked, they are deposited by each worker on the lower front end of conveyor 19, interposed therebetween, and are conveyed upwardly and thence rearwardly thereof.

A suitable downwardly curved tubular discharge spout 41 may be suitably attached to the rear of conveyor frame 21 so that a flexible container 42 may be suitably suspended therefrom to receive vegetables being discharged from the conveyor. When filled, the container may be removed and replaced, or the container may be positioned on a suitable wheeled trailer 43 attached by a hitch to the rear of frame 2 and towed by the harvester.

As engine 27 serves to drive the rear drive wheel 18 and the conveyor 19, it is desired that a throttle and associated starter controls therefor, not shown, be accessible to a worker while supported on a cradle so that forward motion and stopping of the harvester may be controlled. Thus, an elongated throttle rod 45 is suitably attached to the throttle and starter mechanism and projects forwardly along a side of frame 2 and is provided with an outwardly curved forward end 46 with a lateral extension 47 thereon which is positioned adjacent a foot saddle 53. Control of the throttle may be readily effected by removing a foot from its saddle 53 to engage and actuate rod 45, in an obvious manner, to govern forward travel of the harvester.

If desired, a worker may be positioned on either side of central frame 2 to the rear of cross frame 7 and may grasp the latter and assist in guiding and manoeuvering the harvester.

While a preferred embodiment has been shown and described, it is to be understood that various changes and improvements may be made therein without departing from the scope and spirit of the appended claims.

What is claimed is:

1. A mobile self-propelled crop harvester for harvesting crops planted in rows in a field comprising in combination, an elongation angularly disposed central frame having wheel means at the rear end thereof, a cross frame adjacent and connected to the forward upper end of said central frame, laterally adjustable wheel means depending from the ends of said cross frame, endless conveyor means spacedly supported horizontally above and by said central frame and having a forward portion extending downwardly and forwardly therefrom, power source means arranged on said central frame and drivingly connected to said conveyor and rear wheel means, vertically adjustable bracket means depending from said cross frame on opposite sides of said central frame, and horizontal rigid cradle means carried by said bracket means and contoured and shaped to correspond with a human body torso and legs for supporting a pair of workers in reclining forwardly extending face down positions adjacent the forward end of said conveyor means, said cradle means being formed with neck receiving recesses and diverging supporting portions whereby crops picked by said workers are disposed on said downwardly and forwardly extending conveyor and delivered rearwardly of said harvester, and throttle control means associated with one of said leg supporting portions for operation by one worker to control the actuation of said power source means.

2. A mobile self-propelled crop harvester according to claim 1, wherein said cradle supporting bracket means includes spaced U-shaped brackets depending from said cross frame, and said cradle means includes rigid generally rectangular body supports extending horizontally between said brackets.

3. A mobile self-propelled crop harvester according to claim 1, wherein said cradle body supports are molded of plastic and have padding means on the upper faces thereof.

4. A mobile self-propelled crop harvester according to claim 1, wherein foot receiving stirrup means is provided on the terminal ends of said diverging leg portions.

5. A mobile self-propelled crop harvester according to claim 4, wherein throttle rod control means extends from said power source means and terminates adjacent one of said stirrup means whereby a worker reclining on one of said cradle support means may disengage a foot from one of said stirrup means and engage said throttle rod control means to control the actuation of said power source means.

* * * * *